US00RE38164E

(19) United States
(12) Reissued Patent
Wagi et al.

(10) Patent Number: US RE38,164 E
(45) Date of Reissued Patent: Jul. 1, 2003

(54) DESKTOP COLOR COPIER WHICH INCLUDES A REVOLVING TYPE DEVELOPING DEVICE

(75) Inventors: Susumu Wagi, Tokyo (JP); Kyoji Omi, Kawasaki (JP)

(73) Assignee: Ricoh Company, Ltd., Tokyo (JP)

( * ) Notice: This patent is subject to a terminal disclaimer.

(21) Appl. No.: 09/851,088

(22) Filed: May 9, 2001

Related U.S. Patent Documents

Reissue of:
(64) Patent No.: 6,049,396
Issued: Apr. 11, 2000
Appl. No.: 09/040,458
Filed: Mar. 18, 1998

U.S. Applications:

(63) Continuation of application No. 08/581,922, filed on Jan. 2, 1996, now Pat. No. 5,838,456, which is a continuation-in-part of application No. 08/215,608, filed on Mar. 22, 1994, now Pat. No. 5,600,445.

(30) Foreign Application Priority Data

Mar. 23, 1993 (JP) ..... 5-089351

(51) Int. Cl.[7] ..... C01N 1/27; H04N 1/46; G03G 21/00

(52) U.S. Cl. ..... 358/300; 358/501; 399/107; 399/106; 399/227; 399/302; 399/108; 399/119

(58) Field of Search ..... 358/300, 501, 358/296, 400, 401, 500, 551; 346/145; 399/107, 108, 178, 223, 227, 298, 302, 303, 312, 313, 92, 154, 120, 228

(56) References Cited

U.S. PATENT DOCUMENTS 4,705,385 A 11/1987 Palm et al.
5,038,170 A 8/1991 Serita
5,189,478 A 2/1993 Hara et al.
5,258,819 A * 11/1993 Kimura et al.
5,357,330 A * 10/1994 Hauser
5,390,006 A * 2/1995 Wakabayashi et al.
5,440,373 A * 8/1995 Deki et al.
5,512,984 A * 4/1996 Kimura et al.
5,541,722 A * 7/1996 Ikeda et al.
5,585,598 A * 12/1996 Kasahara et al.
5,587,783 A * 12/1996 Nakamura et al.
5,600,445 A * 2/1997 Omi
5,617,198 A * 4/1997 Ishikawa et al.
5,640,645 A * 6/1997 Namekata et al.
5,666,599 A * 9/1997 Miyasaka et al. ..... 399/162
5,838,456 A 11/1998 Wagi et al.
6,112,036 A 8/2000 Shinohara

FOREIGN PATENT DOCUMENTS

DE 3 237 410 * 4/1983
JP 6-276334 * 9/1994

OTHER PUBLICATIONS

Nihon Keizui Shinbun (newspaper) p. 12, Nov. 14, 1995.*

* cited by examiner

*Primary Examiner*—Gregory J. Toatley, Jr.
(74) *Attorney, Agent, or Firm*—Oblon, Spivak, McClelland, Maier & Neustadt, P.C.

(57) ABSTRACT

A desktop color copier having a size which allows the copier to be placed on a stand when the copier is used. The desktop color copier includes a photoconductive drum for sequentially forming toner images of respective colors thereon, a charger for charging the photoconductive drum, an exposure device for exposing the charged photoconductive drum, a revolving type developing device for forming color toner images on the photoconductive drum, an image transferring devices which includes an intermediate transfer belt to which the color toner images are sequentially transferred one on top of the other, and a fixing device for fixing the color toner images on a sheet of paper. The desktop color copier includes a single paper feed tray which is located under the transferring device.

53 Claims, 8 Drawing Sheets

DESKTOP COLOR COPIER WHICH INCLUDES A REVOLVING TYPE DEVELOPING DEVICE

Matter enclosed in heavy brackets [ ] appears in the original patent but forms no part of this reissue specification; matter printed in italics indicates the additions made by reissue.

CROSS REFERENCES TO RELATED APPLICATIONS

This application is a continuation of application Ser. No. 08/581,922, filed on Jan. 2, 1996 now U.S. Pat. No. 5,838,456 which is a continuation-in-part application of Ser. No. 08/215,608, filed on Mar. 22, 1994 now U.S. Pat. No. 5,600,445.

BACKGROUND OF THE INVENTION

1. Field of the Invention

The present invention relates to a color copier. More particularly, the invention is concerned with a desktop color copier which can be used on a stand.

2. Description of the Related Art

It is desired to provide a space saving office device such as a copier, printer, or facsimile machine in order to minimize the amount of space occupied by the office device. Considering transportation of the office device, it is also desired to construct the office device to have measurements which are smaller than the entrance of an elevator.

In order to satisfy the aforementioned demand, a desktop black and white copier has been put on the market. The desktop copier usually can be used on a stand and therefore the measurements, especially the height, are small. It is desirable for the height of the desktop copier which is on the stand to be about 950 mm in view of the operation of the copier. It is also desirable that a desktop color copier be put on the market in order to satisfy demand. However, it is very difficult to manufacture a desktop color copier because color image forming devices, at least three developing devices and an intermediate transfer device which are not necessary for the black and white copier are necessary for a color copier, and therefore it is very difficult to provide a small desktop color copier. As proof of that, a desktop color copier has not been put on the market.

Further, the color copier has two or more paper feed devices since the color copier has more functions than the white and black copier. As a result, the color copier becomes large-size and therefore the desktop color copier cannot be built.

In view of improvement of efficiency of design and cost-efficiency, it is desired to reduce the size of the color copier. Namely, in order to improve efficiency of design and reduce the cost, it is essential to use common parts among different copiers. In order to use common parts, it is essential to use a common frame which determines the size of the copier for both the black and white copier and the color copier.

However, image forming devices, at least three developing devices and an intermediate transfer device, which are not necessary for the black and white copier are necessary for the color copier and therefore, the size of the color copier is larger than that of the black and white copier. As a result, it is impossible to use common parts, especially a common frame, for both the color copier and the black and white copier.

SUMMARY OF THE INVENTION

Accordingly, one object of this invention is to provide a novel color copier which can solve the aforementioned drawbacks. A further object of the present invention is to provide a color copier which can be used on a stand.

In order to achieve the above-mentioned objects, according to the present invention, a color image forming apparatus for forming a toner image on a sheet of paper includes an image carrier for sequentially forming toner images of respective colors thereon, a charger for charging the image carrier, an exposing device for exposing the charged carrier and forming electrostatic latent images of respective colors on the image carrier, and a revolving type developing device which is rotatively supported in the color image forming apparatus.

The revolving type developing device includes a plurality of color developing devices, each of which includes a developing unit for developing a toner image on the image carrier when the developing unit faces the image carrier and a toner supply unit for supplying toner to the developing unit. The external shape of the revolving type developing device is cylinder.

The color image forming apparatus further includes an intermediate transfer belt to which the toner images are sequentially transferred one above the other, a primary transferring charger for sequentially transferring the toner images from the image carrier to the intermediate transfer belt, thereby forming a composite toner image on the intermediate transfer belt, at least one paper feed tray for storing sheets of paper and feeding a sheet of paper. There is also a secondary image transferring charger for transferring the composite toner images from the intermediate transfer belt to the sheet of paper which is fed from the paper feed tray, and a fixing device for fixing the toner image on the sheet of paper. The color image forming apparatus is usually used when the color image forming apparatus is on a stand.

Other objects and aspects of the present invention will become apparent herein.

BRIEF DESCRIPTION OF THE DRAWINGS

A more complete appreciation of the invention and many of the attendant advantages thereof will be readily obtained as the same becomes their understood by reference to the following detailed description when considered in connection with the accompanying drawings, wherein.

DESCRIPTION OF THE PREFERRED EMBODIMENTS

Description of the Digital Color Copier

Figure 1:
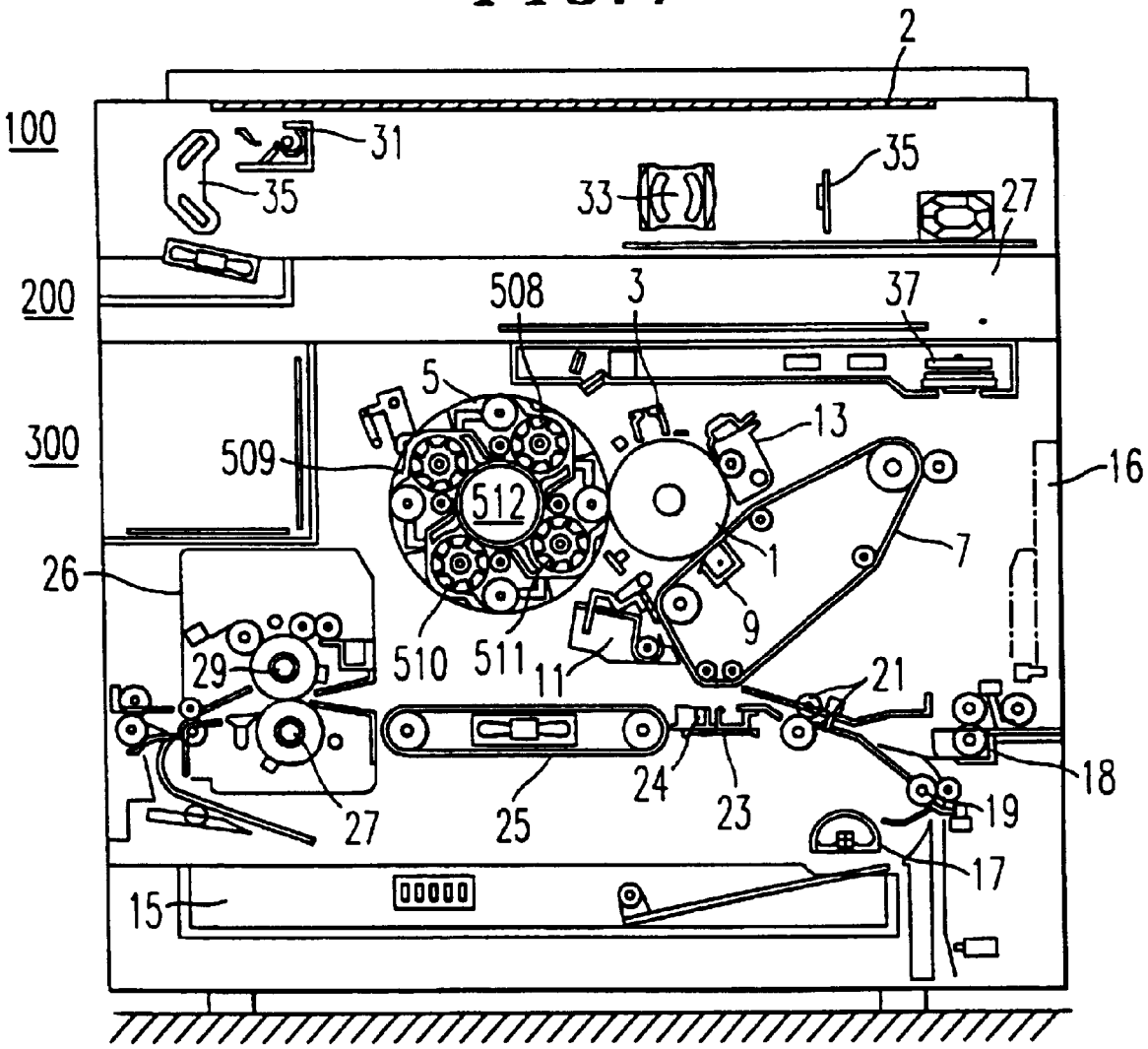
FIG. 1 is a schematic sectional view showing a digital color copier embodying the present invention.

Referring now to the drawings, wherein like reference numerals designate identical or corresponding parts throughout the several views, and more particularly to FIG. 1 thereof, a digital color copier embodying the present invention is shown. As shown, the digital color copier has a scanner unit 100 which scans and image on a document, control unit 200 which has a electric circuit such as a control board having a microprocessor and so on, and a printer unit 300 which forms a toner image on a sheet of paper.

The scanner unit 100 includes a first device 31 which irradiates light onto the document, a second device 35 which reflects light from the document to a lens 33 and a charge coupled device 35.

The printer unit 300 has a rotatable photoconductive drum 1. The printer unit 300 also includes a charger 3 which charges the photoconductive drum 1, a revolving type developing device 5, an intermediate transfer belt 7 which bears a composite toner image, a primary transfer charger 9 which transfers the toner image on the photoconductive drum 1 to the intermediate transfer belt 7, a belt cleaning device 11 which cleans residual toner on the intermediate transfer belt 7 and a cleaning device 13 which cleans residual toner on the photoconductive drum 1. The revolving type developing device is made up of a yellow developing unit 508, a magenta developing unit 509, a cyan developing unit 510 and a black developing unit 511 which are mounted on a movable support 512. In FIG. 1, a toner supply unit which is disposed in front of the revolving type developing device 5 with respect to the operating position of the copier is not illustrated.

The printer unit 300 further includes a single paper feed tray 15 which stores sheets of paper, a manual paper feed tray 16, a first pick up roller 17 which feeds a sheet of paper from the paper feed tray 15, a second pick up roller 18 which feeds a sheet of paper from the manual feed tray 16, a pair of paper transport rollers 19 which transport the sheet of paper, a pair of resister rollers 21 which feed the sheet of paper to a transfer position so as to synchronize the composite toner image on the intermediate transfer belt 7 and the sheet of paper, a secondary transfer charger 23 which transfers a toner image on the intermediate transfer belt 7 to the sheet of paper, a paper transport belt 25 and a fixing device 26 which includes a pressure roller 27 and a fixing roller 29 to fix the toner image on the sheet of paper. The printer unit 300 further includes a laser exposing device 37 which irradiates the photoconductive drum 1 with laser light in response to an image signal produced in accordance with the image detected by the charge coupled device 35.

Figure 2:
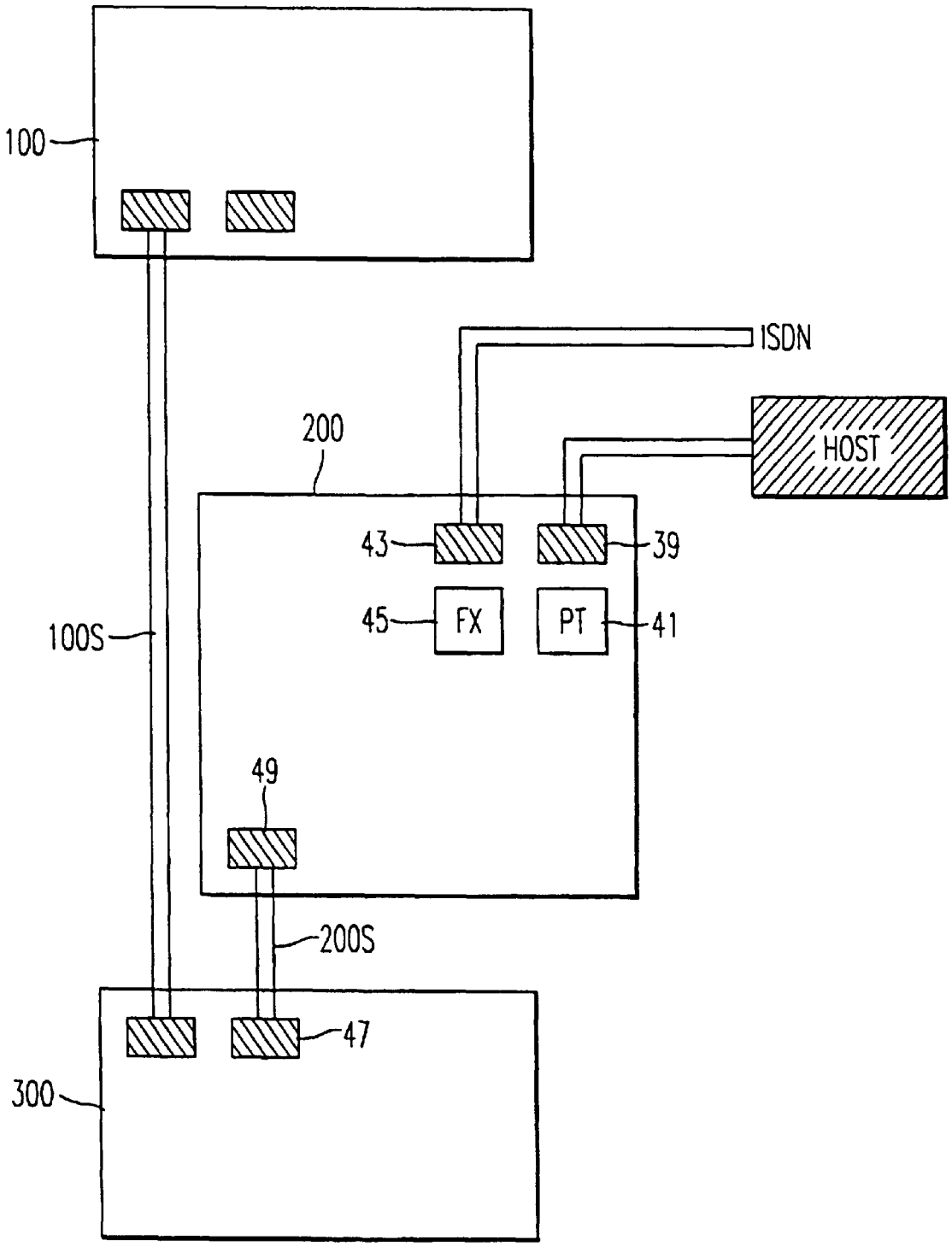
FIG. 2 is a block schematic diagram showing a control unit of the digital color copier embodying the present invention.

As shown in FIG. 2, the control unit 200 includes an interface 39 which connects the digital copier to a host computer, a printer processing board 41 which converts print data in a page description language format received from the interface 39 to raster data, an interface 43 which connects the digital color copier to a public line such as an ISDN, a color facsimile processing board 45 which expands or decompresses data in a specified compression format received from the interface 43 and compresses image data read by the scanner unit 100 into a specified format, and an interface 49 which sends data to the interface 47 and receives data from the interface 47.

Next, a description is set forth for functions of each section of digital color copier as shown in FIG. 1.

Read Operation of the Scanner Unit

The document to be scanned is placed on a platen glass 2 with a surface to be copied facing downward. The lens 33 forms an image of the document in a reduced size on the charge coupled device 35. The charge coupled device 35 has a red image pickup section, a green image pickup section and a blue image pickup section.

An illuminating lamp and a first mirror are mounted on the first device 31, while a second mirror and a third mirror are mounted on the second device 35. The first and second devices 31 and 35 move as a scanning operation is being performed. When scanning the image on the document, the first device 31 and the second device 5 are driven at the scanning speeds Vsub and Vsub/2, respectively for scanning from the left edge to the right edge by a scanning motor.

Operation of the Printer Unit

When an image forming cycle is started, the photoconductive drum 1 is rotated counterclockwise and the intermediate transfer belt 7 is rotated clockwise. Formation of a black toner image, a cyan toner image, a magenta toner image and a yellow toner image is executed successively in association with rotation of the intermediate transfer belt 7. Finally the toner images are superimposed in the order of Black, Cyan, Magenta and Yellow on the intermediate transfer belt 7 to form a composite toner image.

First, formation of the black image is executed at described below. The charger 3 charges the photoconductive drum 1 with a negative voltage of −700 V. Then the laser exposing device 37 executes laser exposure in response to a black signal and subsequently an electrostatic latent image of the black image is formed on the photoconductive drum 1. Recording signals for forming the electrostatic latent image are provided from the scanner unit 100 in the copying mode, and from the control unit 300 in a facsimile mode or a printer mode.

Toner in the black developing unit 511 is charged to a negative polarity when mixed and agitated with a ferrite carrier, and a developing roller for the black toner in the black developing unit 511 is biased to a voltage level where a negative DC voltage and an AC voltage are superimposed by a power source (not illustrated). As a result, the toner does not adhere to an area of the photoconductive drum 1 where an electric charge is still remaining but the toner does adhere to an area having no electric charge, namely in the area exposed to light.

Thus, when the toner image on the photoconductive drum 1 is rotated counterclockwise and reaches a position opposite to the transfer charger 9, the toner image is transferred to the intermediate transfer belt 7 which contacts the photoconductive drum 1 and is driven at the same speed as that of the photoconductive drum 1. A small quantity of residual toner not transferred and remaining on the photoconductive drum 1 is cleaned by the cleaning device 13.

The intermediate transfer belt 7 is made of material having an appropriate resistance value to maintain image carriage characteristics for a long time as is often requested in the printer mode. This feature makes it possible for a toner image to be maintained for a long time; for instance for 20 minutes until formation of the next cyan toner image. The surface resistance value of the belt 7 is preferably $10^9$ to $10^{10}\Omega$, and the volume resistance of the belt 7 is preferably $10^{10}$ to $5\times10^{11}$ $\Omega\cdot$cm.

Then prior to exposure by a laser for forming a cyan image based on a cyan signal, the developing unit 5 is rotated counterclockwise, and the cyan developing unit 510 is moved so that the cyan developing unit 510 will face the photoconductive drum 1. Then a tip position of the black visual toner image previously formed is detected by a tip detection sensor (not illustrated), and the data request signal for requesting transfer of recorded cyan image data in a specified time is again issued to the scanner unit 100 in the copying mode and to the control unit 200 in the facsimile mode and the printer mode. This request signal is issued simultaneously when the tip detection sensor detects a black toner mark image for registration provided a little ahead of the effective black image in the previous process and the effective black image. Also, a system in which a permanent mark is put in place of the black toner mark on the intermediate transfer belt 7 may be used.

If a cyan signal is received in precise synchronism with the request signal, exposure of a cyan image, development and primary transfer are executed. Further, accurate color print section alignment can be executed against the original black image; namely the cyan image is correctly superimposed on the black image on the intermediate transfer belt 7. Thus, when the photoconductive drum 1 is exposed to light which corresponds to the cyan image, electric charge in proportion to a quantity of light of the cyan image is removed from the photoconductive drum 1 which was initially uniformly charged, thus forming the electrostatic latent image.

Cyan toner in the developing unit 510 is charged to a negative polarity, and the cyan development roller in the developing unit is held in contact with the photoconductive drum 1 and is biased to a voltage similar to that in the black developing unit. As a result, the toner does not adhere to a section of the photoconductive drum 1 where electric charge remains while cyan toner adheres to a section exposed to light corresponding to the cyan image signal, and a cyan toner image corresponding to the electrostatic latent image is formed.

Similarly a magenta image and a yellow image are superimposed on the black and cyan toner images. A full-color image formed on the intermediate transfer belt 7 which has rotated at least fourth times as described above is rotated and transferred to a position of the transfer charger 23.

On the other hand, at a timing when formation of an image is started, a sheet of paper is fed from one of the paper feed tray 15 and the manual paper feed tray 16, and reaches a nip of the resister rollers 21. The resister rollers 21 are driven so that a tip of the sheet of paper coincides with a tip of the image when a tip of a toner image on the intermediate transfer belt 7 is passing by the transfer charger 23, thus performing registration alignment between the sheet of paper and the image.

Thus the sheet of paper superimposed on an image on the intermediate transfer belt 7 passes under the secondary transfer charger 23 connected to a positive voltage power source (not illustrated). Then most of the toner image is transferred to the sheet of paper. When the sheet of paper passes over a discharging brush 24, the sheet of paper is discharged, and most of the absorbing force between the intermediate transfer belt 7 and sheet of paper disappears. Then the tare weight of the sheet of paper becomes larger than the isolating force when the sheet of paper is separated from the intermediate transfer belt 7.

The sheet of paper with a toner image thereon is transferred by the transport belt 25 to a fixing device 26. Heat and pressure are applied to the sheet of paper at a nip between the pressure roller 27 and the fixing roller 29 and the toner image is fixed on the sheet of paper. The sheet of paper is discharge from the copier and is stacked on a paper discharge tray.

Revolving Type Developing Device

Figure 3A:
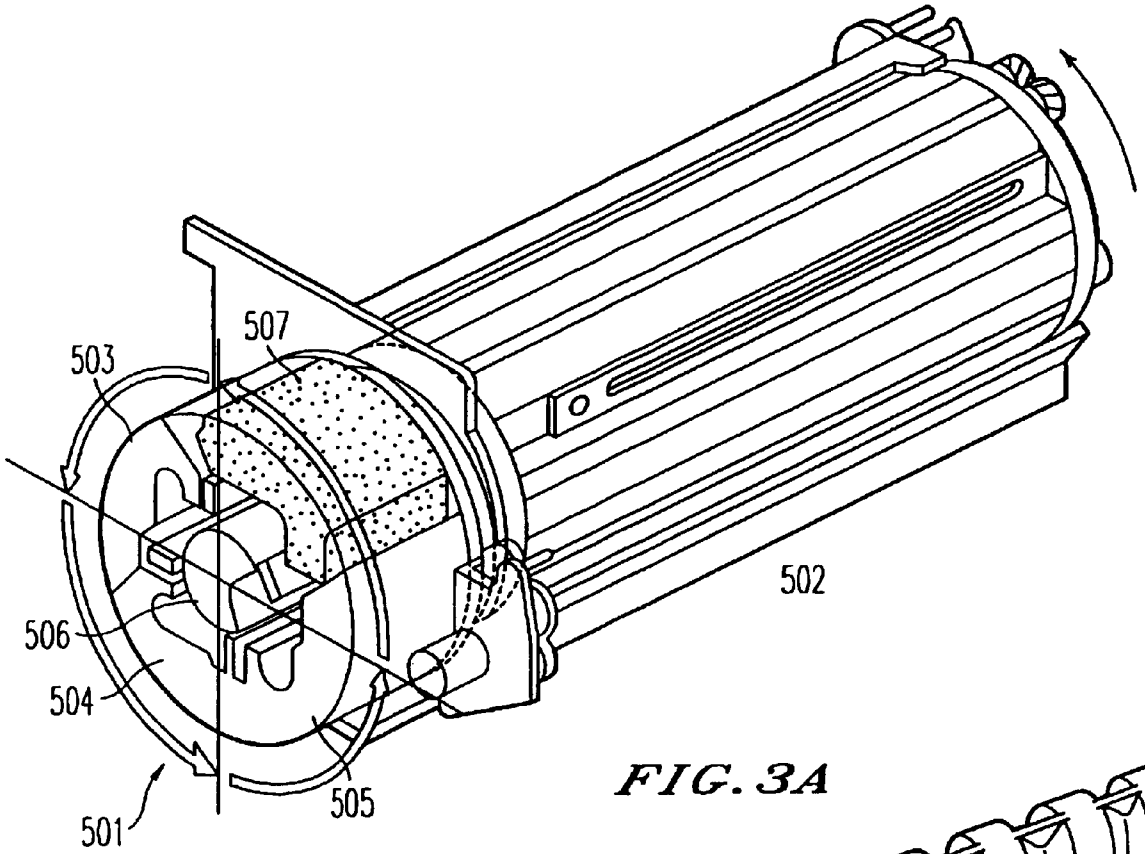
FIG. 3A is a perspective view showing the general construction of a developing device of the present invention including a black developing cartridge 506.

FIG. 3A shows a revolving type developing device. Referring to FIG. 3A, the revolving type developing device 5 which includes a toner supply device 501 and a developing tank 502 in a body is rotatively supported on the printer unit 300. The toner supply device 501 includes a yellow toner cartridge 503, a magenta toner cartridge 504, a cyan toner cartridge 505, and a black toner hopper 507. The developing tank 502 includes a yellow developing tank, a magenta developing tank, a cyan developing tank, and a black developing tank, each of which includes a developing roller, an agitator and so on. The yellow developing tank, the magenta developing tank, the cyan developing tank and the black developing tank face the yellow toner cartridge 503, the magenta toner cartridge 504, the cyan toner cartridge 504 and the black toner hopper 507, respectively.

Figure 3B:
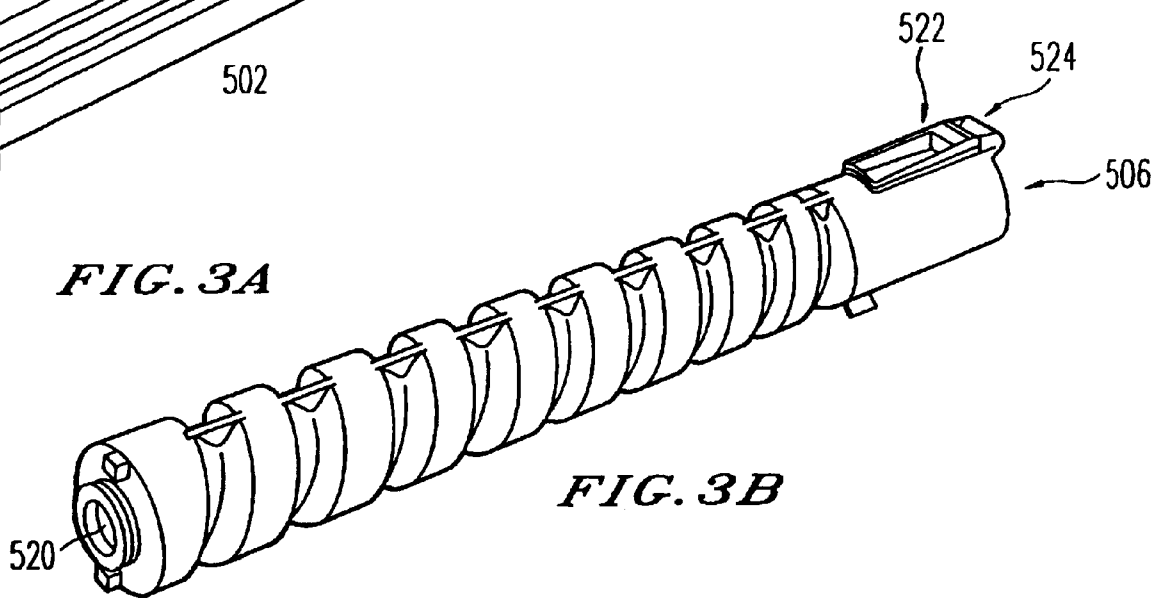
FIG. 3B is a perspective view from the rear showing the black toner cartridge 506.

There is a black toner cartridge 506 which is a cylindrical cartridge have a length which runs from the toner supply device 501 to the end of the developing tank or unit 502 as shown in FIG. 3B. This toner cartridge revolves around the axis of rotation of the toner supply device 501. In this embodiment, the black toner cartridge 506 is located at the axis of rotation of the toner supply device 501, although it is possible for the black toner cartridge 506 to be located away from the axis of rotation of the toner supply device 501. The toner cartridges are each made of a plastic or plastic-like substance, are purchased full of toner, and disposable. Alternatively, the toner cartridges are refillable.

FIG. 3B is a view from the rear of the black toner cartridge 506. The rear of the cartridge 506 includes an opening 520 through which the cartridge is filled at the factory. Once filled, this opening 520 is sealed. A spiral groove is formed inside the black toner cartridge 506. When the black toner cartridge 506 rotates, black toner is supplied to the black toner hopper 507 through an opening 522, and then black toner is supplied from the black toner hopper 507 to the black toner developing tank. The cartridge 506 includes a latching mechanism 524 which connects the cartridge 506 to the body of the toner supply device 501. The capacity of the black toner cartridge is greater than that of the other toner cartridges.

As mentioned above, when development for the black toner image is executed, the black developing tank faces the photoconductive drum 1 by rotating the revolving type developing device 5. When development for the yellow toner image is executed, the revolving type developing device 5 rotates and then the yellow developing tank faces the photoconductive drum 1. The operation of the magenta toner image and for the cyan toner image is as same as that of the yellow toner image.

According to the present embodiment, a body of the revolving type developing device is small, since the toner supply device 501 and the developing tank 502 are in the body and therefore, it is not necessary to provide a toner transport device between the toner supply device and the developing tank which is exterior to the developing tank. As a result, the digital color copier or other color printing device becomes small.

Figure 4A:
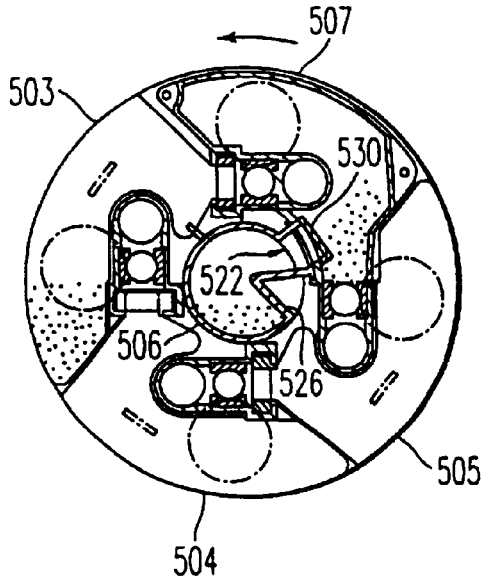
FIGS. 4A–4D illustrate the rotation of the developing device and the manner of transferring toner from the black toner cartridge 506 to the hopper 507.

FIGS. 4A–4D illustrate the revolving of the toner supply device 501 which causes black toner to be transferred from the black toner cartridge 506 to the black toner hopper 507. FIG. 4A illustrates the developing device with the black toner developer located at the developing position. In this figure, there is illustrated the black toner cartridge 506 in the center thereof having an opening 522 and a triangular ridge 526. The opening 522 of the black toner cartridge 506 at this time is closed by a door 530. In the illustrated embodiment, the door 530 is opened and closed by gravity. As an alternative, the door is operated using either a mechanical or electromechanical device. In this position, black toner does not commute between the black toner hopper 507 and the black toner cartridge 506.

Figure 4B:
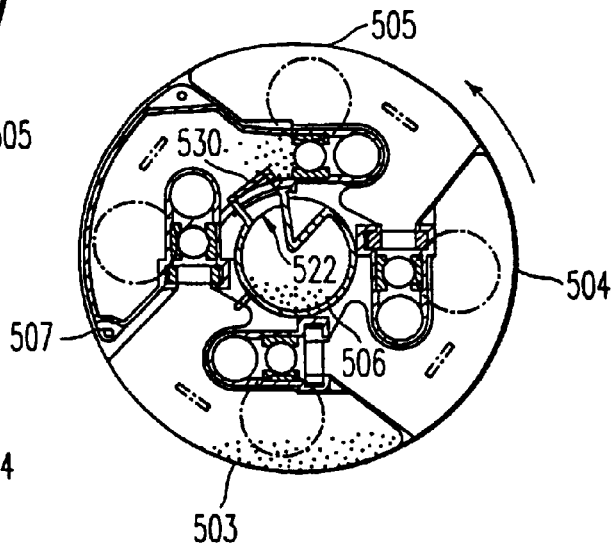

FIG. 4B illustrates the cyan toner cartridge 505 in the developing position after the toner supply device 501 rotates one quarter of a revolution counter-clockwise. In this position, the door 530 which closes the opening 522 remains closed.

Figure 4C:
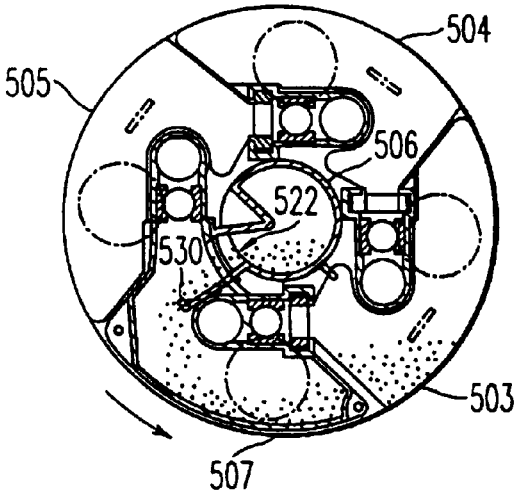

FIG. 4C illustrates the magenta toner cartridge 504 in the developing position. In this figure, the door 530 has fallen open due to gravity. Once the door is open, toner within the cartridge 506 flows through the opening 522 and into the black toner hopper 507.

Figure 4D:
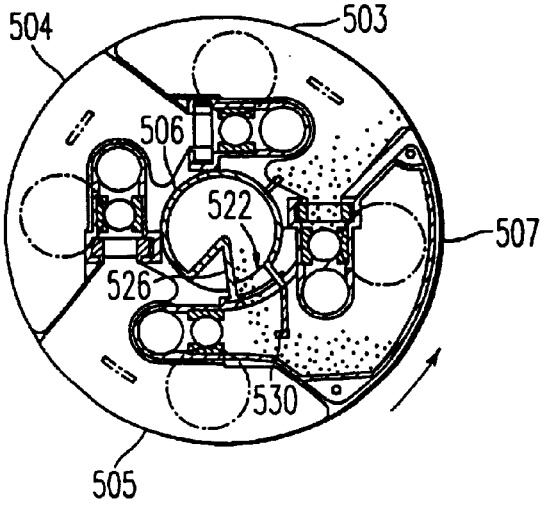

FIG. 4D illustrates the toner supply device 501 which has been rotated so that the yellow toner cartridge 503 is in the developing position. In this position, the door 530 remains open due to gravity and black toner continues to flow from the black toner cartridge 506 to the black toner hopper 507. In this figure, the triangular ridge 526 guides the black toner through the opening 522. The triangular ridge 526 extends from the front of the cartridge 506 to the point of the cartridge 506 where the spiral ends or alternately, to a point of the cartridge 506 before the spiral starts.

After one more quarter of a revolution, the toner supply device 501 returns to the position illustrated in FIG. 4A and the door 530 is closed due to gravity and toner cannot commute between the cartridge 506 and the hopper 507.

Figure 5:
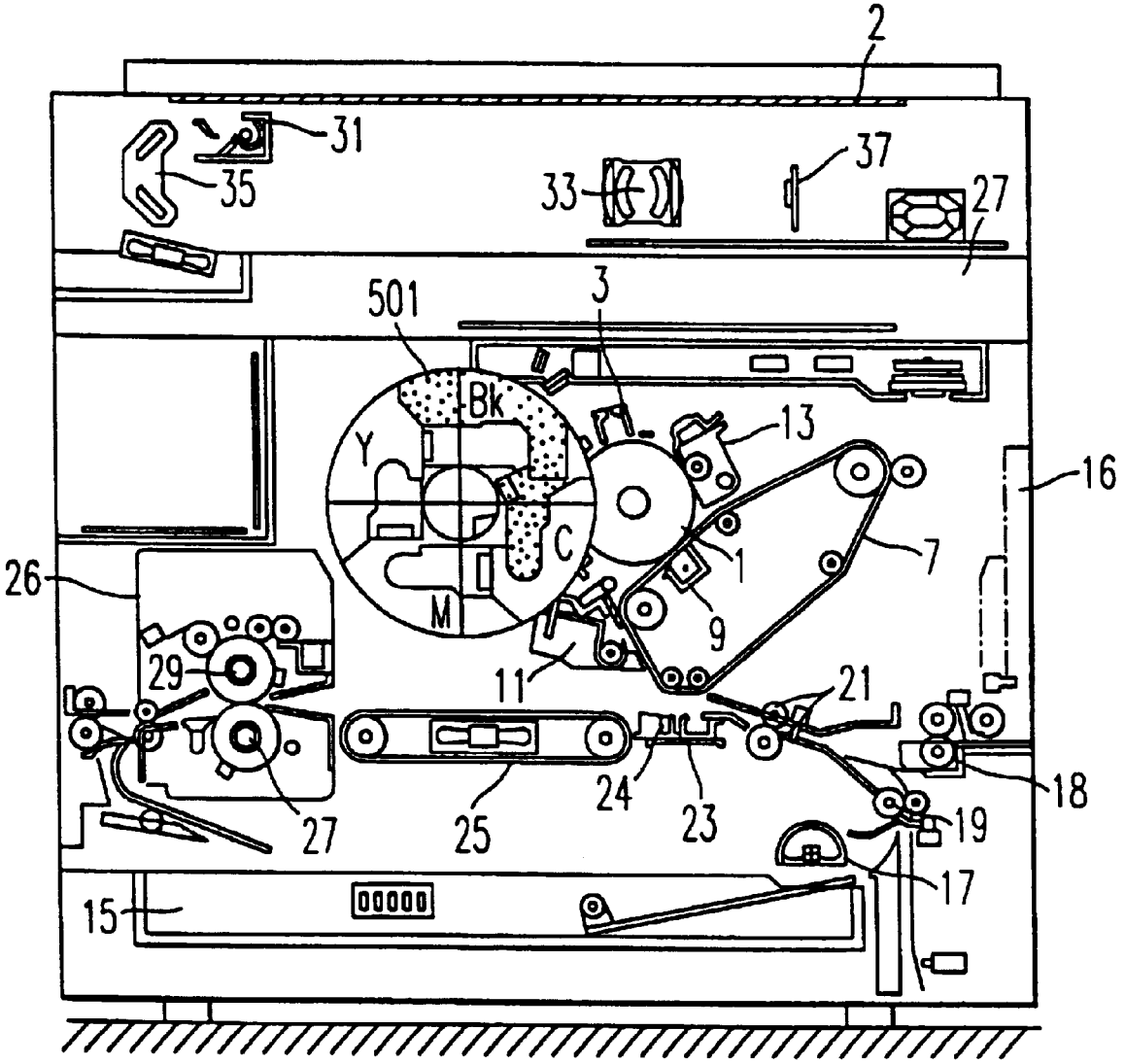
FIG. 5 is a schematic sectional view showing the digital color copier embodying the present invention.

FIG. 5 shows a color digital copier in which the toner supply device is incorporated in the copier. In the present embodiment, in order to reduce the size of the digital color copier the diameter of the toner supply device 501 is larger than that of the developing tank 502

Size of the Copier

As mentioned above, it is desirable that the height of the desktop type copier while on a stand be about 950 mm. The height of a conventional desktop type black and white copier is usually about 570 mm, and therefore the height of the stand is about 380 mm (950 mm minus 570 mm), 950 mm being the desired height. It is desirable that measurements of the digital color copier be the same as that of the desktop type black and white copier in order to promote the efficiency of design and to cut cost by using a common frame for the color copier and the block and white copier. Further in view of the carriage of the copier, it is necessary to provide the digital color copier with measurements which are smaller than the entrance of an elevator.

Figure 7:
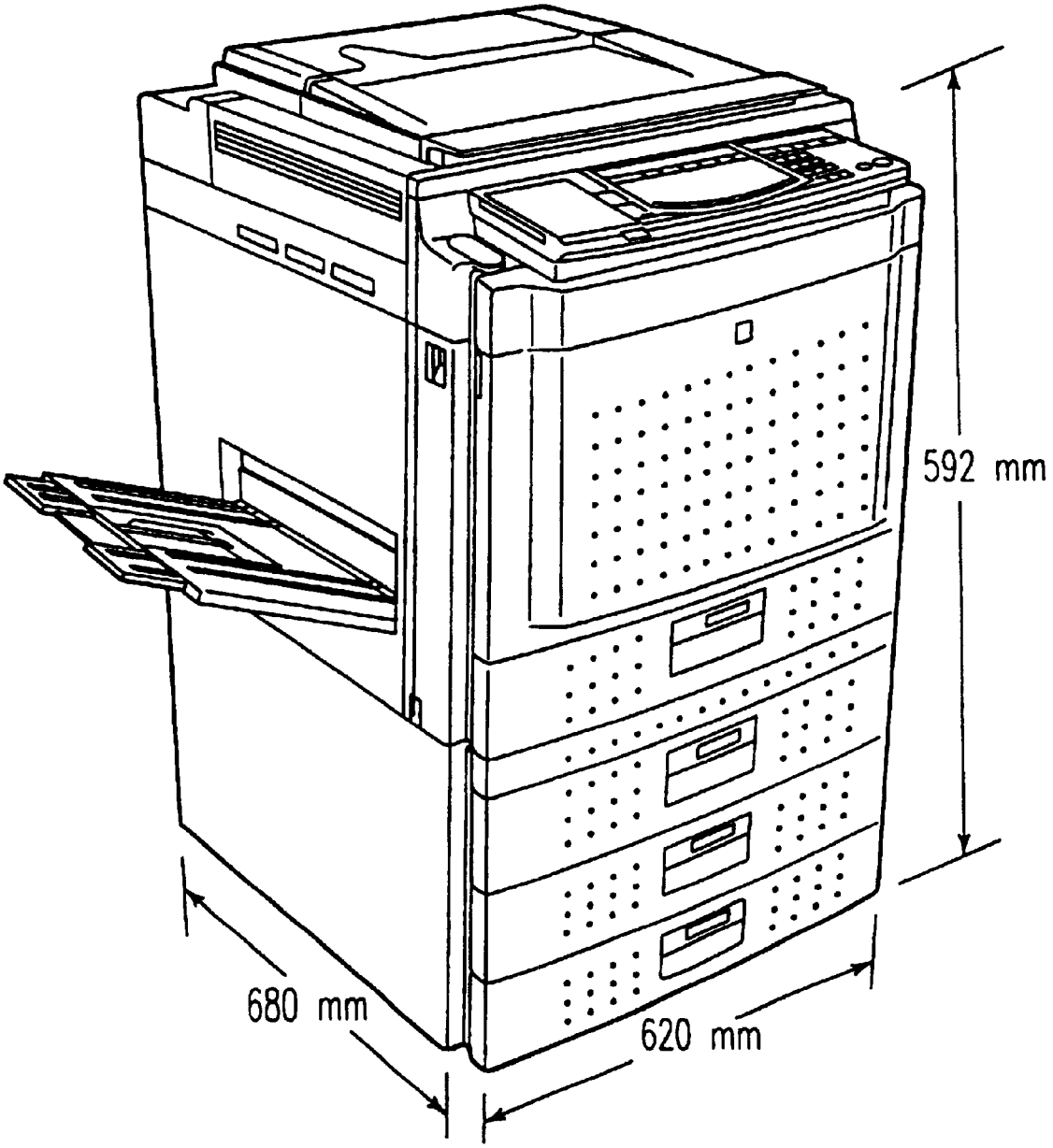
FIG. 7 is a schematic perspective view of the digital color copier embodying the present invention.

From the aforementioned viewpoints, the measurements of the digital color copier of the present embodiment are as follows: the width is 620 mm, the depth is 680 mm, and the height is 592 mm as shown in FIG. 7. It is allowable if each of the measurements changes within ±30 mm from the actual dimension of the digital color copier.

Sizes of Photoconductive Drum and Intermediate Transfer Belt

The intermediate transfer belt with respect to the moving direction of the belt must be longer than the length of the maximum size of the sheet of paper which can be used by the digital color copier of the present embodiment, since the intermediate transfer belt must bear an entire toner image which corresponds to a document which is to be copied. The maximum size of the sheet of paper which can be used by the color copier is A3 size (210 mm×420 mm) or DLT (Double Letter)size (11 inch×11 inch=279.5 mm×4.22 mm). Further, it is necessary that the length of the intermediate transfer belt with respect to the moving direction of the belt be an integral number of times as the length of the photoconductive drum with respect to the moving direction of the drum (i.e., the outer circumference of the photoconductive drum), since it is necessary for the tip of the toner image on the photoconductive drum to coincide with the intermediate transfer belt. In order to provide a small color copier, it is necessary to reduce the length of the photoconductive drum and that of the intermediate transfer belt. However, since the length of the transfer belt must be an integral number of times as that of the photoconductive drum, if the length of the photoconductive drum becomes long, that of the intermediate transfer belt also becomes long. As a result, the color copier becomes large.

The invention have examined a possibility of adopting various sizes of photoconductive drums. As a result of the examination, it turned out that the maximum size of the photoconductive drum had to be ϕ 90 (90 mm in diameter) in order to satisfy the aforementioned condition and to satisfy the measurements of the copier being 680±30 mm×620±30 mm×592±30 mm. In this condition, the length of the intermediate transfer belt was twice that of the photoconductive drum.

On the other hand, it is necessary to locate a plurality of process devices, such as a charger, a revolving type developing device, an intermediate transfer belt, and a cleaning device around a photoconductive drum. The inventors also examined the minimum size of the photoconductive drum, which could accommodate the process devices. As a result of the examination, it turned out that the minimum size of the photoconductive drum had to be ϕ 30 (30 mm in diameter). If the size of the photoconductive drum was less than 30 mm, it was not possible to locate the process devices around the photoconductive drum. In this condition, the length of the intermediate transfer belt was five or six times that of the photoconductive drum.

Cooling for Developing Device

In order to provide a desktop color copier, it is necessary to reduce the size of the copier. As a result, the developing device has to be located close to the fixing device such as approximately 10 mm. Therefore, toner in the developing device is hardened by means of heat from the fixing device.

Figure 6:
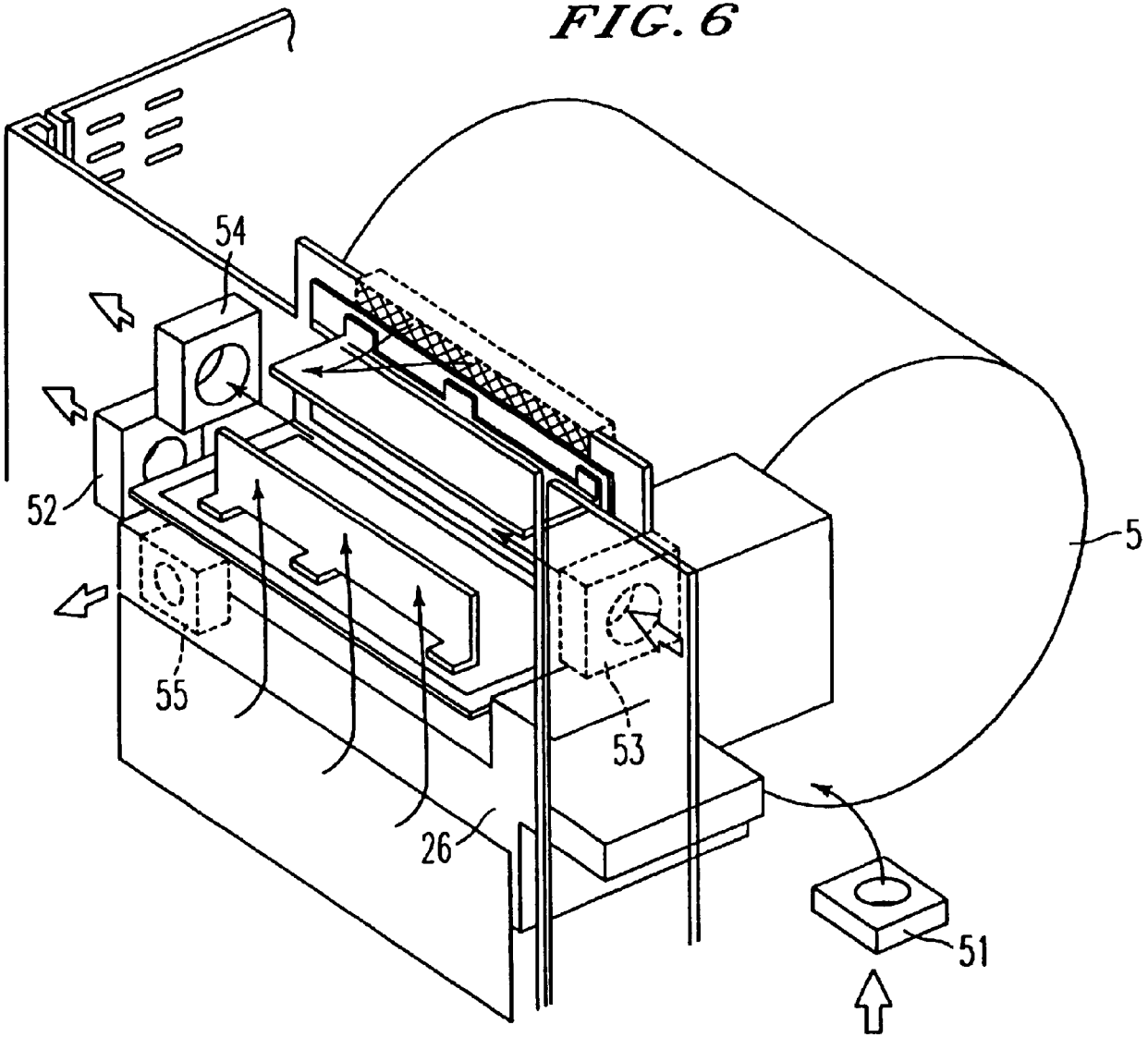
FIG. 6 is a partial perspective view of the digital copier embodying the present invention.

In the present embodiment, cooling air flows in a direction indicated by arrows as shown in FIG. 6. Referring to FIG. 6, fans 51–55 are provided around the fixing device 26. The fan 51 which is an intake fan and the fan 2 which is an exhaust fan create an air flow between the developing device 5 and the fixing device 26 and therefore heat from the fixing device 26 is not transmitted to the developing device 5. Further, the fan 53 which is an intake fan and the fans 54 and 55 which are exhaust fans create air flow above the fixing device 26 which prevents heat from gathering above the fixing device 5 and lowers the temperature of the fixing device 5.

System Configuration of Desktop Color Copier

Figure 8:
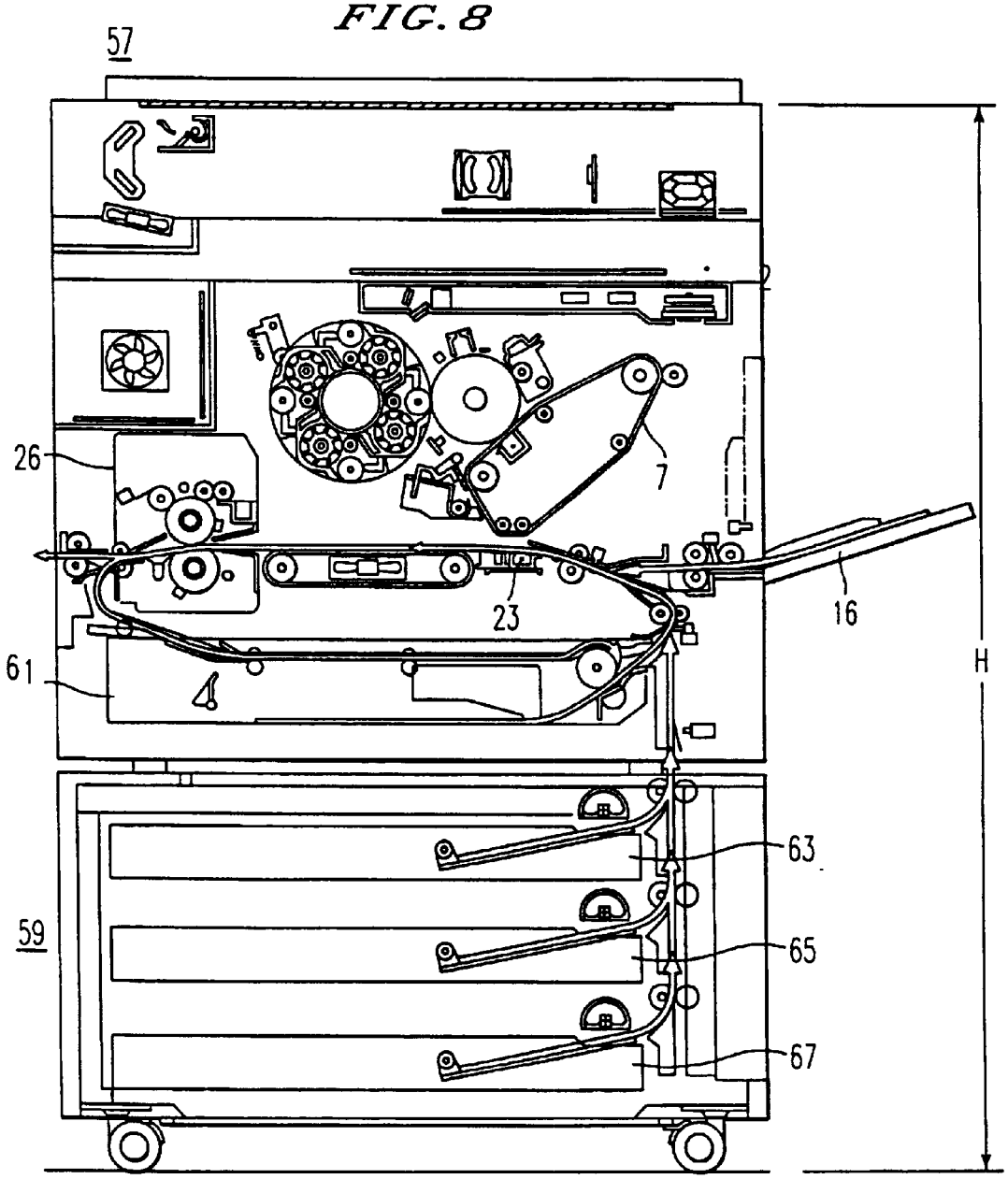
FIG. 8 is a schematic sectional view of the digital color copier which is on a stand embodying the present invention.

FIG. 8 shows a desktop digital color copier which is on a stand. Referring to FIG. 8, the desktop color copier 57 is on a paper feed bank 59 which is used as the stand. Alternatively, the stand may be a simple supporting stand without paper feeding capabilities. In the present embodiment, the paper feed tray 15 of FIG. 1 is replaced with a duplex paper feed tray 61. A sheet of paper is fed from a manual paper feed tray 16 or one of paper feed trays 63–67 to the transfer charger 23 where a toner image on the intermediate transfer belt 7 is transferred to the sheet of paper. After the transferring operation, the sheet of paper is transported to the duplex paper feed tray 61 via the fixing device 26. The sheet of paper is stacked in the duplex paper feed tray 61 with the image side facing upward. Then the sheet of paper is fed from the duplex paper feed tray 61 toward the secondary transferring charger 23 where a toner image on the intermediate transfer belt 7 is transferred to the other side on the sheet of paper.

In the embodiment illustrated in FIG. 8, the height H of the digital color copier is 950 nm.

Obviously, numerous modifications and variations of the present invention are possible in light of the above teachings. It is therefore to be understood that within the scope of the appended claims, the invention may be practiced otherwise than a specifically described herein.

What is claimed as new and desired to be secured by Letters Patent of the United States is:

1. A color image forming apparatus for forming a toner image on a sheet of paper, comprising:

an image carrier for substantially forming toner images of respective colors thereon;

a charger for charging said image carrier;

an exposure device for exposing said image carrier which has been charged and forming electrostatic latent images of respective colors on said image carrier;

a revolving type developing device which is rotatively supported in said color image forming apparatus, including a plurality of color developing devices, each of which includes a developing unit for developing a toner image on said image carrier when said developing unit faces said image carrier and a toner supply unit for supplying toner to said developing unit, wherein an external shape of said revolving type developing device is a cylinder;

an intermediate transfer belt to which said toner images are sequentially transferred on top of previously transferred toner images;

a primary transferring charger for sequentially transferring said toner images from said image carrier to said intermediate transfer belt to form a composite toner image on said intermediate transfer belt;

at least one paper feed tray for storing sheets of paper and feeding the sheets of paper one at a time;

a secondary image transferring charger for transferring said composite toner image from said intermediate transfer belt to one of the sheets of paper; and a fixing device for fixing said toner image on said sheet of paper, wherein a length of said intermediate transfer belt is greater than a circumference of said image carrier.

2. A color image forming apparatus as claimed in claim 1, wherein said image forming apparatus is a color copier.

3. A color image forming apparatus as claimed in claim 2, wherein said at least one paper feed tray is a single paper feed tray.

4. A color image forming apparatus as claimed in claim 3, wherein said paper feed tray is located under said image carrier, said revolving type developing device, said intermediate transfer belt, said primary transfer charger, said secondary transfer charger, and said fixing device.

5. A color image forming apparatus as claimed in claim 2, wherein said color image forming apparatus is a digital color copier.

6. A color image forming apparatus as claimed in claim 1, wherein said image carrier is a photoconductive drum having a diameter from 30 mm to 90 mm.

7. A color image forming apparatus as claimed in claim 6, wherein a length of said intermediate transfer belt with respect to the moving direction of said belt is an integral number of times a circumference of said photoconductive drum.

8. A color image forming apparatus as claimed in claim 7, further comprising a stand for supporting the image forming apparatus, said stand having a plurality of paper feed trays from which said one of the sheets of paper is fed, wherein said at least one paper feed tray is a duplex paper feed tray.

9. A color image forming apparatus as claimed in claim 1, wherein the revolving type developing device includes a cylindrical black toner cartridge disposed along an axis of rotation of the revolving type developing device.

10. A color image forming apparatus as claimed in claim 9, wherein said plurality of color developing devices include cyan, magenta, and yellow developing devices, each having toner cartridges which rotate with the revolving type developing device.

11. A color image forming apparatus as claimed in claim 10, wherein the black toner cartridge has a door which opens and closes by a force due to gravity as the revolving type developing device revolves such that tone is permitted to flow from the black toner cartridge when the door is open and toner is not permitted to flow between the black toner cartridge and a corresponding development unit of the developing device when the door is closed.

12. A color image forming apparatus according to claim 1, further comprising:

a stand for supporting the color image forming apparatus.

13. A color image forming apparatus according to claim 12, wherein a height of the color image forming apparatus when being supported by the stand is less than or equal to 950 mm.

14. A color image forming apparatus according to claim 12, wherein a height of the stand is at least 380 mm.

15. A color image forming apparatus according to claim 1, wherein said revolving type development device is located within 10 mm from said fixing device.

16. An apparatus according to claim 1, further comprising:

a fan which creates an air flow between said revolving type developing device and said fixing device for cooling said revolving type developing device.

17. An apparatus according to claim 1, wherein:

the length of said intermediate transfer belt is at least twice as great as the circumference of said image carrier.

18. An apparatus according to claim 1, wherein:

the length of said intermediate transfer belt is at least five times as great as the circumference of said image carrier.

19. A color image forming apparatus for forming a toner image on a sheet of paper, comprising:

an image carrier for sequentially forming toner images of respective colors thereon;

a charger for charging said image carrier;

an exposure device for exposing said image carrier which has been charged and forming electrostic latent images of respective colors on said image carrier;

a revolving type developing device which is rotatively supported in said color image forming apparatus, including a plurality of color developing devices, each of which includes a developing unit for developing a developing a toner image on said image carrier when said developing unit faces said image carrier;

intermediate transfer belt to which said toner images are sequentially transferred on top of previously transferred toner images;

primary transferring charger for sequentially transferring said toner images from said image carrier to said intermediate transfer belt to form a composite toner image on said intermediate transfer belt;

at least one paper feed tray for storing sheets of paper and feeding the sheets of paper one at a time;

a secondary image transferring charger for transferring said composite toner image from said intermediate transfer belt to one of the sheets of paper; and a fixing device for fixing said toner image on said sheet of paper, wherein a length of said intermediate transfer belt is greater than a circumference of said image carrier.

20. A color image forming apparatus as claimed in claim 19, wherein said image forming apparatus is a color copier.

21. A color image forming apparatus as claimed in claim 20, wherein said at least one paper feed tray is a single paper feed tray.

22. A color image forming apparatus as claimed in claim 21, wherein said paper feed tray is located under said image carrier, said revolving type developing device, said intermediate transfer belt, said primary transfer charger, said secondary transfer charger, said fixing device.

23. A color image forming apparatus as claimed in claim 20, wherein said color image forming apparatus is a digital color copier.

24. A color image forming apparatus as claimed in claim 19, wherein said image carrier is a photoconductive drum having a diameter from 30 mm to 90 mm.

25. A color image forming apparatus as claimed in claim 24, wherein a length of said intermediate transfer belt with respect to the moving direction of said belt is an integral number of times a circumference of said photoconductive drum.

26. A color image forming apparatus as claimed in claim 25, further comprising a stand for supporting the image forming apparatus, said stand having a plurality of paper feed trays from which said one of the sheets of paper is fed, wherein said at least one paper feed tray is a duplex paper feed tray.

27. A color image forming apparatus as claimed in claim 19, wherein said revolving type developing device is located within 10 mm from said fixing device.

28. A color image forming apparatus as claimed in claim 27, further comprising:

fans which create an air flow between said revolving type developing device and said fixing device for cooling said revolving type developing device.

29. A color image forming apparatus as claimed in claim 19, wherein the revolving type developing device includes a cylindrical black toner cartridge disposed along an axis of rotation of the revolving type developing device.

30. A color image forming apparatus as claimed in claim 29, wherein said plurality of color developing devices include cyan, magenta, and yellow developing devices, each having toner cartridges which rotate with the revolving type developing device.

31. A color image forming apparatus as claimed in claim 30, wherein the black toner cartridge has a door which opens and closes by a force due to gravity as the revolving type developing device revolves such that toner is permitted to flow from the black toner cartridge when the door is open and toner is not permitted to flow between the black toner cartridge and a corresponding developing unit of the developing device when the door is closed.

32. A color image forming apparatus as claimed in claim 19, further comprising:

a stand for supporting the color image forming apparatus.

33. A color image forming apparatus as claimed in claim 32, wherein a height of the color image forming apparatus when being supported by the stand is less than or equal to 950 mm.

34. A color image forming apparatus as claimed in claim 32, wherein a height of the stand is at least 380 mm.

35. An apparatus according to claim 19, further comprising:

a fan which creates an air flow between said revolving type developing device and said fixing device for cooling said revolving type developing device.

36. An apparatus according to claim 19, wherein:

the length of said intermediate transfer belt is at least twice as great as the circumference of said image carrier.

37. An apparatus according to claim 19, wherein:

the length of said intermediate transfer belt is at least five times as great as the circumference of said image carrier.

*38. A color image forming apparatus for forming a toner image on a sheet of paper, comprising:*

*an image carrier for sequentially forming toner images of respective colors thereon;*

*a charger which is proximate to said image carrier;*

*an exposure device for exposing said image carrier which has been charged and forming electrostatic latent images of respective colors on said image carrier;*

*a revolving type developing device which is rotatively supported in said color image forming apparatus such that a locus of the rotation of said revolving type developing device is overlapped with a locus of the rotation of said image carrier, said revolving type developing device including a plurality of color developing devices, each of which includes a developing unit for developing a toner image on said image carrier when said developing unit faces said image carrier;*

*an intermediate transfer medium which is disposed proximate to said image carrier such that said toner images are sequentially transferred on top of a previously transferred toner image on said intermediate transfer medium;*

*at least one paper feed tray for storing sheets of paper;*

*rollers which feed the sheets of paper one at a time from said at least one paper feed tray to said intermediate transfer medium from which said toner images are transferred to said sheets of paper; and*

*a fixing device for fixing said toner images on said sheets of paper,*

*wherein a length of said intermediate transfer medium is greater than a circumference of said image carrier.*

*39. An apparatus according to claim 38, wherein the revolving type developing device includes:*

*a toner chamber disposed at a circumferential portion of the revolving type developing device; and*

*a toner storage device connected to the toner chamber such that when the revolving*

*type developing device rotates, toner is transferred from the toner storage device to the toner chamber.*

*40. An apparatus according to claim 39, further comprising:*

*a door which opens and closes due to gravity as the revolving type developing device revolves such that toner is permitted to flow from the toner storage device*

*to the toner chamber when the door is open and toner is not permitted to flow between the toner storage device to the toner chamber when the door is closed.*

*41. An apparatus according to claim 40, wherein:*

*the door is mounted to the toner chamber.*

*42. An apparatus as claimed in claim 39, wherein:*

*a length of said intermediate transfer medium with respect to the moving direction of said medium is an integral number of times a circumference of said image carrier.*

*43. An apparatus as claimed in claim 42, wherein said at least one paper feed tray comprises:*

*a duplex paper feed tray which is located under said image carrier, said revolving type developing device, said intermediate transfer medium, and said fixing device, said duplex paper feed tray arranged such that it holds paper during duplex image processing; and*

*a paper supply tray, separate from the duplex feed tray, for supporting paper on which images are formed.*

*44. An apparatus as claimed in claim 43, wherein said duplex paper feed tray is located above the paper supply tray.*

*45. An apparatus as claimed in claim 38, wherein:*

*a length of said intermediate transfer medium with respect to the moving direction of said medium is an integral number of times a circumference of said image carrier.*

*46. A color image forming apparatus for forming a toner image on a sheet of paper, comprising:*

*an image carrier for sequentially forming toner images of respective colors thereon:*

*a charger which is proximate to said image carrier;*

*an exposure device for exposing said image carrier which has been charged and forming electrostatic latent images of respective colors on said image carrier;*

*a revolving type developing device which is rotatively supported in said color image forming apparatus including a plurality of color developing devices, each of which includes a developing unit for developing a toner image on said image carrier when said developing unit faces said image carrier;*

*an intermediate transfer belt which is disposed proximate to said image carrier such that said toner images are sequentially transferred on top of a previously transferred toner image on said intermediate transfer belt;*

*at least one paper feed tray for storing sheets of paper;*

*rollers which feed the sheets of paper one at a time from said at least one paper feed tray to said intermediate transfer belt from which said toner images are transferred to said sheets of paper; and*

*a fixing device for fixing said toner images on said sheets of paper,*

*wherein a length of said intermediate transfer belt is greater than a circumference of said image carrier.*

*47. An apparatus according to claim 46, wherein the revolving type developing device includes:*

*a toner chamber disposed at a circumferential portion of the revolving type developing device; and*

*a toner storage device connected to the toner chamber such that when the revolving type developing device rotates, toner is transferred from the toner storage device to the toner chamber.*

*48. An apparatus according to claim 47, further comprising:*

*a door which opens and closes due to gravity as the revolving type developing device revolves such that toner is permitted to flow from the toner storage device to the toner chamber when the door is open and toner is not permitted to flow between the toner storage device to the toner chamber when the door is closed.*

*49. An apparatus according to claim 48, wherein:*

*the door is mounted to the toner chamber.*

*50. An apparatus as claimed in claim 47, wherein:*

*a length of said intermediate transfer belt with respect to the moving direction of said belt is an integral number of times a circumferential of said image carrier.*

*51. An apparatus as claimed in claim 50, wherein said at least one paper feed tray comprises:*

*a duplex paper feed tray which is located under said image carrier, said revolving type developing device, said intermediate transfer belt, and said fixing device, said duplex paper feed tray arranged such that it holds paper during duplex image processing; and*

*a paper supply tray, separate from the duplex feed tray, for supplying paper on which images are formed.*

*52. An apparatus as claimed in claim 51, wherein said duplex paper feed tray is located above the paper supply tray.*

*53. An apparatus as claimed in claim 46, wherein:*

*a length of said intermediate transfer belt with respect to the moving direction of said belt is an integral number of times a circumference of said image carrier.*

* * * * *